United States Patent
LaFiandra

[11] Patent Number: 6,084,332
[45] Date of Patent: *Jul. 4, 2000

[54] HIGH ACTUATOR DENSITY DEFORMABLE MIRROR

[75] Inventor: Carlo LaFiandra, New Canaan, Conn.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/992,022

[22] Filed: Dec. 17, 1997

[51] Int. Cl.$^7$ .................................................. H01L 41/08
[52] U.S. Cl. ............................. 310/311; 310/366; 310/328
[58] Field of Search ..................................... 310/328, 366, 310/311

[56] References Cited

U.S. PATENT DOCUMENTS

| | | | |
|---|---|---|---|
| 4,190,785 | 2/1980 | Kompanek | 310/330 |
| 4,462,092 | 7/1984 | Kawabuchi et al. | 310/336 |
| 4,678,000 | 7/1987 | Kushida | 310/328 |
| 5,210,653 | 5/1993 | Schell | 310/328 |
| 5,357,825 | 10/1994 | Costello et al. | 310/311 |
| 5,367,501 | 11/1994 | Kelly et al. | 310/337 |
| 5,636,070 | 6/1997 | Ji et al. | 310/328 |
| 5,638,209 | 6/1997 | Okada et al. | 310/335 |
| 5,745,278 | 4/1998 | La Fiandra | 310/328 |
| 5,793,149 | 8/1998 | Theil et al. | 310/328 |
| 5,804,906 | 9/1998 | Tsutsumi | 310/322 |
| 5,844,349 | 12/1998 | Oakley et al. | 310/358 |
| 5,920,072 | 7/1999 | Palczewska et al. | 310/334 |

FOREIGN PATENT DOCUMENTS

| | | | |
|---|---|---|---|
| 0 427 901 | 5/1991 | European Pat. Off. | 310/311 |
| 3-183371 | 8/1991 | Japan | 310/366 |
| 6-188475 | 7/1994 | Japan | 310/328 |

*Primary Examiner*—Thomas M. Dougherty
*Attorney, Agent, or Firm*—William C. Schubert; Glenn H. Lenzen, Jr.

[57] ABSTRACT

An assembly comprises a plurality of thin plate-like members (2,2) arranged in a side-by-side manner. An array (6) of piezoelectric actuators (10,10) is disposed along a portion (5) of each of said actuators. A plurality of leads (34,34) are disposed along each of said plate-like members and each is connected to a respective one of said piezoelectric actuators.

10 Claims, 4 Drawing Sheets

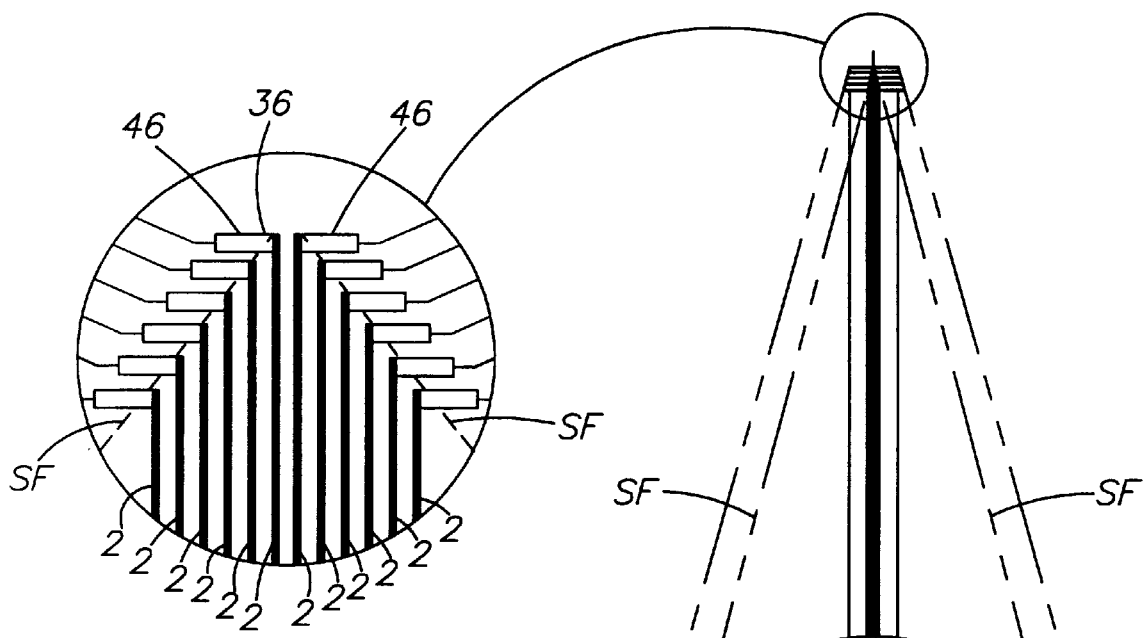
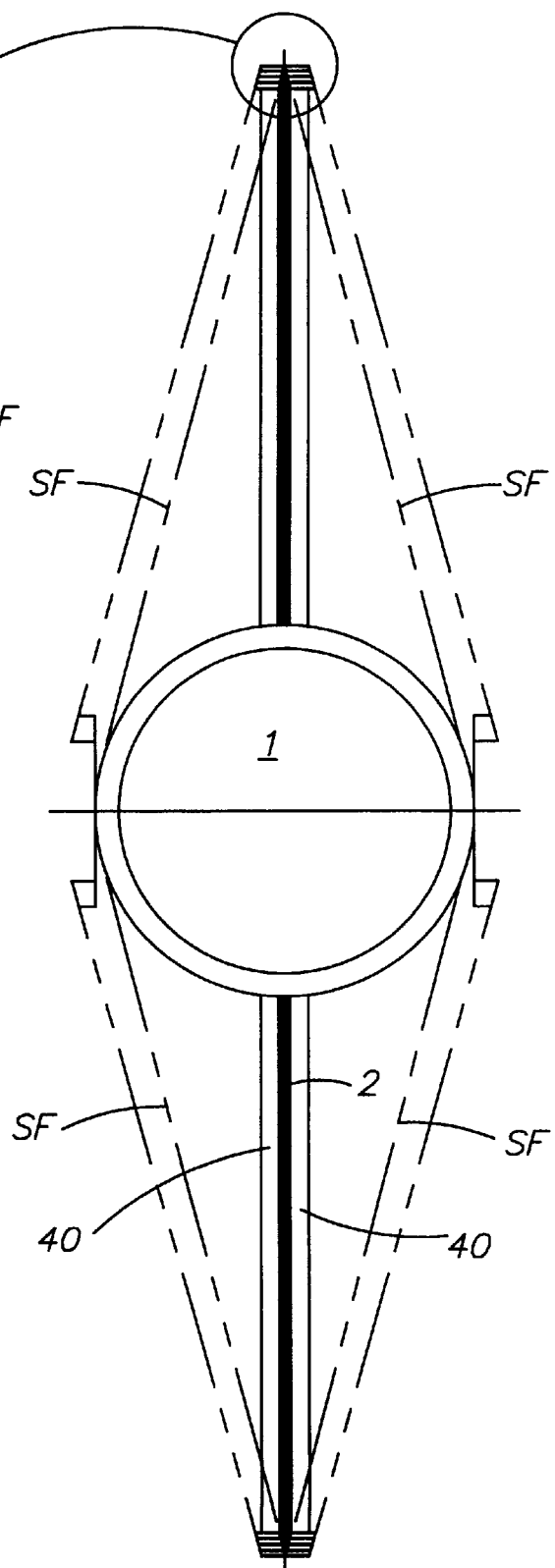
FIG. 5
FIG. 4

HIGH ACTUATOR DENSITY DEFORMABLE MIRROR

This application relates to U.S. application Ser. Nos. 08/293,787, entitled, "DEGORMABLE MIRROR WITH REMOVABLE ACTUATORS; U.S. Pat. No. 5,535,043 Ser. No. 08/965,440, entitled MONOLITHIC DEFORMABLE MIRROR ASSEMBLY; Ser. No. 08/982,920, entitled, HUGH ENERGY BURST DEFORMABLE MIRROR; now U.S. Pat No. 5,940,203 Ser. No. 08/071,510, entitled INTEGRAL HIGH ENERGY BUTTON DEFORMABLE MIRROR, now U.S. Pat. No. 5,917,644 U.S. Pat. No. 5,745,278 entitled INNOVATIVE DEFORMABLE MIRROR ACTUATOR CONFIGURATION, and U.S. application Ser. No. 09/236,761 entitled DEFORMABLE MIRROR WITH REMOVABLE ACTUATOR USING SHAPED ALLOYS.

BACKGROUND OF THE INVENTION

The present invention relates to a deformable mirror primarily intended for use as a beam train optic where frequency response, reliability, and cost of manufacture are critical to the design, performance and usefulness. Thus, the invention has particular usefulness in deformable mirrors that are used in adaptive optical systems. This would include low and high energy beam train configurations.

A deformable mirror which is used as a downstream optic in conjunction with a substantially larger optical system which is disposed upstream thereof must possess a high degree of sensitivity with respect to its ability to make highly minute adjustments to the reflective surface of the mirror. This is because such optical downstream mirrors represent the upstream optics in miniature. Such mirrors have a diameter in the range of five to fifteen inches, but for the larger sizes use on the order of about one thousand separate piezoelectric actuators to effect such adjustments. As can be expected, the nearly one thousand piezoelectric actuators which are used, are highly miniaturized and make assembly of the approximately one thousand piezoelectric actuators with the deformable mirror painstakingly tedious. The prior art produces actuators on an individual piece by piece basis. Each actuator is fabricated individually and assembled and wired into the final assembly one by one. The disadvantage of this method is the small size of the actuators (½ to 1 mm in size) make them difficult or near impossible to incorporate into an assembly without the expenditure of considerable labor hours.

The present invention thus has the specific advantages of the elimination of such mechanical figure control actuators, force or displacement types, which require individual fabrication, assembling and wiring into the final deformable mirror assembly one at a time. Instead, the array of actuators of the present invention are constructed from a plurality of actuator array cards thereby significantly reducing and/or eliminating the traditional hand labor costs required of other mechanical actuator based systems.

In summary, the prior art produces actuators on an individual piece by piece basis. Each actuator is fabricated individually and assembled and wired into the final deformable mirror assembly one by one. The disadvantage of this method is the amount of labor required to accomplish it.

Accordingly, it is an object of the present invention to provide a continually supported deformable mirror support using a plurality of array cards on which are formed a plurality of piezoelectric actuators thereby eliminating manufacturing and assembly costs inherent in systems utilizing such actuators.

A further object of the invention is to provide a continually supported deformable mirror wherein the electrical connections on the cards are formed in a highly repeatable and mass producible manner.

Still a further object of the invention is to provide a continually supported thin mirror which is lighter in weight and less expensive to manufacture than those mirrors heretofore known.

Yet a further object of the invention is to provide a more reliable electrical connection to the actuators of a mirror support.

Yet still a further object of the invention is to reduce the cost of fabricating deformable mirrors.

Another object of the invention lies in the method of fabrication of an assembly permiting significantly lower manufacturing cost, which translates into increased uses as well as lower prices to produce a deformable mirror as compared to the competition.

SUMMARY OF THE INVENTION

An assembly comprises a plurality of thin plate-like members or cards arranged in a side-by-side manner. An array of piezoelectric actuators is disposed a long a portion of each of said actuators. A plurality of leads are disposed along each of said plate-like members and each is connected to a respective one of said piezoelectric actuators.

Ideally, the piezoelectric actuators include opposite vertically extending sides defined by a plurality of stacked electrodes which extend to one of said vertically extending sides depending upon the designated polarity thereof and the assembly includes said plurality of piezoelectric actuators each having a top flat surface which is disposed generally coplanar with the ends of other piezoelectric actuators.

Preferably, each of said plurality of actuators has a conductor screened onto one side thereof and is separated from the other by a spacer and each of said conductors on said actuators and said leads being connected by organic ink conductor thereon.

In the preferred embodiment, each actuator has a configuration of multilayers which are comprised of oppositely charged electrodes which are printed onto stacked layers of ceramic in a vertically interdigitated manner and said electrodes on alternate layers being commonly connected on one of said sides of each actuator by said conductor running the full length thereof making electrical contact with said alternate electrode layers.

Ideally, each said cards is a pre-fired ceramic substrate and each of said cards has preprinted electrical leads formed thereon over which is silk screened organic ink conductors continuously with exposed edges of the actuator and each said actuator array is connected to an associated card by an epoxy connection after prefiring of said card is accomplished.

BRIEF DESCRIPTION OF THE DRAWINGS

FIG. 4 is a top plan view of an assembly of FIG. 3 with a mirror and showing the side face SF in phantom line.

FIG. 5 is a detailed view of the end connectors of the assembly.

DETAILED DESCRIPTION OF THE PREFERRED EMBODIMENT

Figures 1A, 2:
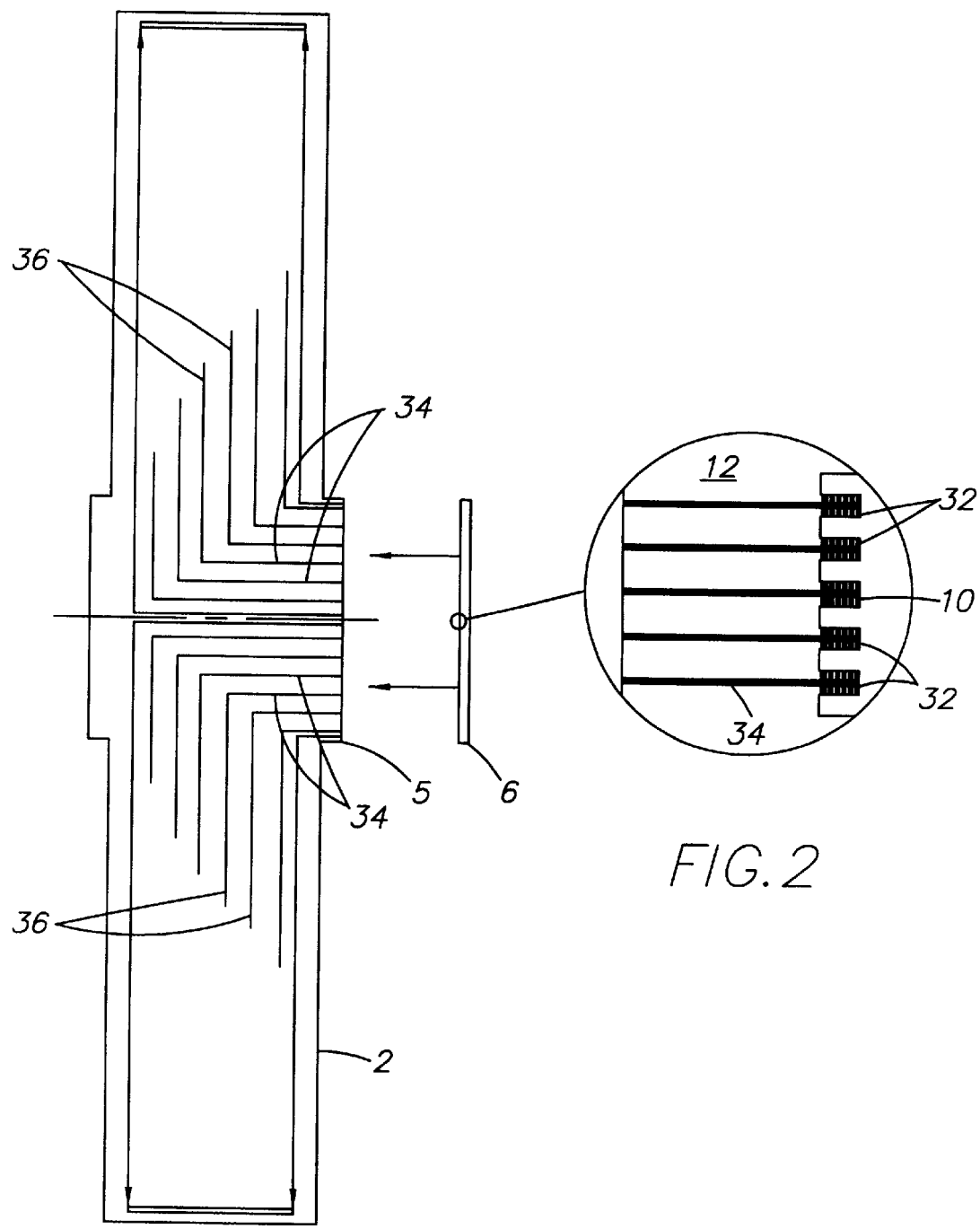
FIG. 1a is a side view of an array card.
FIG. 2 is a detailed fragmentary view of the actuator array.
Figure 1B:
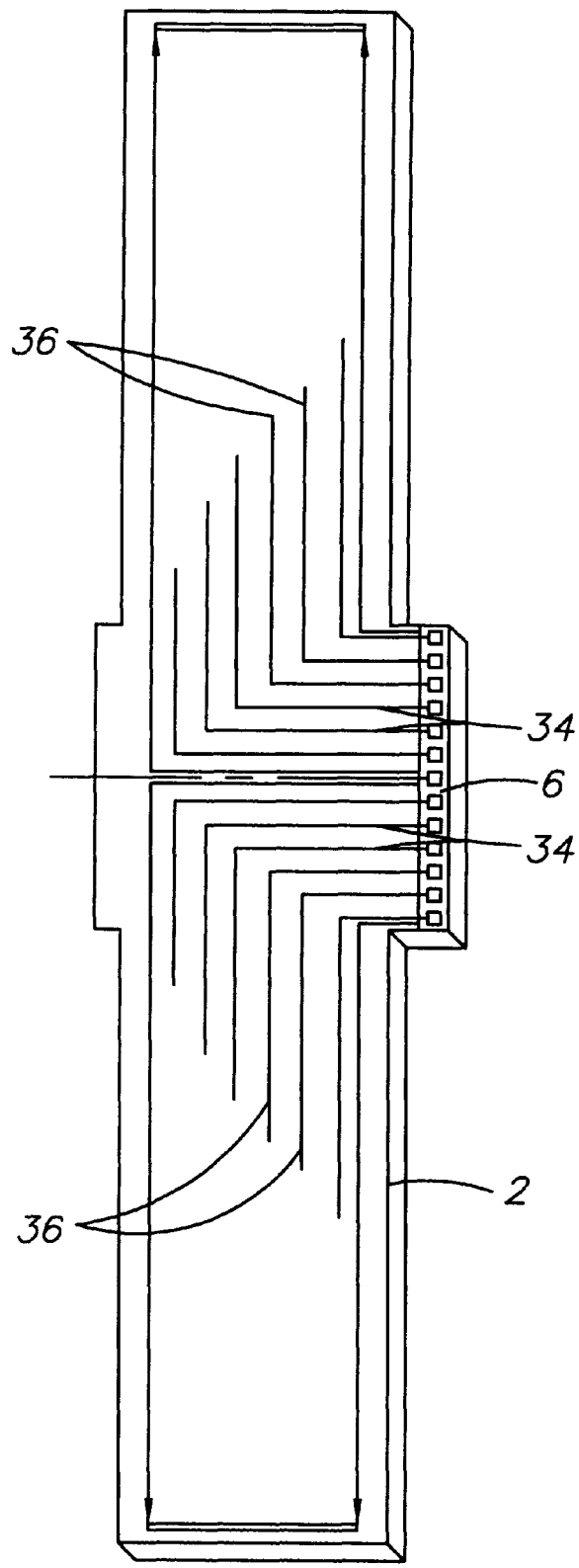
FIG. 1b is a perspective view of the views of FIGS. 1 and 2 put together.
Figure 3:
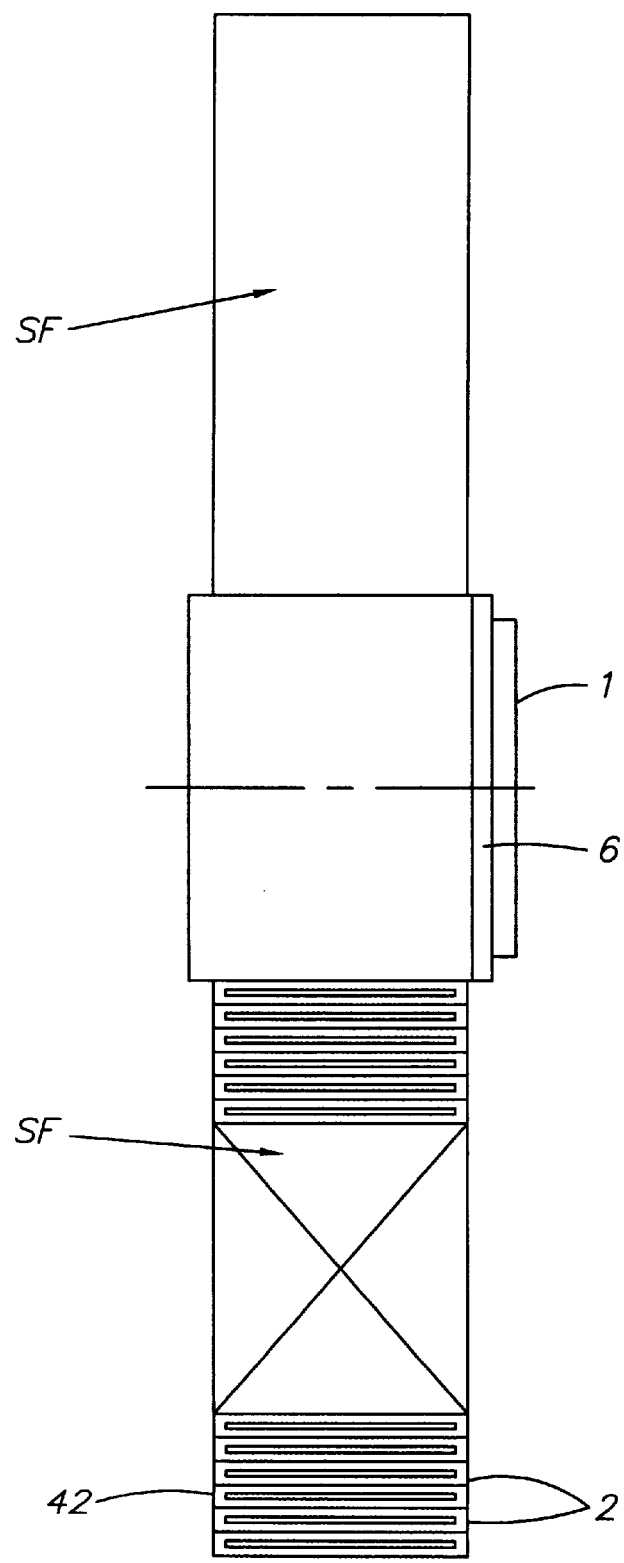
FIG. 3 is a side elevation view of the assembly showing the side face SF of the assembly.

FIG. 1 is a side view of one actuator array card generally designated 2. The plurality of array plate-like members or cards are part of an assembly which includes a deformable faceplate 1 attached to the array cards as a collective. The stock material of the card is primarily ceramic with alternating layers of piezoelectric material silk screened with electrical conductors making up the array group bonded to the top end of each card. That is, the center of each actuator array card 2 contains a raised area 5 on which is epoxy bonded an actuator array group 6 produced by a multilayer process. When the cards are arranged side-by-side with one another, the combined effect of these actuator groups provides the deformable-support-surface for the mirror.

Piezoelectric actuators 10,10 are provided in a conventional multi-layer construction manner as part of the group 6 which is bonded to the top edge of the card. Each actuator of the group has a top support surface which is coplanar with other such surfaces found in the same group as well as those like surfaces found on the other cards in the assembly.

The actuators 10 of each array group 6 are each integrally connected by a common base 12 to create a "comb"-like configuration. The process employed by the invention uses a low "binder" process that permits complete binder burn-off in the solid block state. However, burn off may be done after cutting as an option. In addition, fiducials are placed on the block that ensure consistently accurate placement of the silk screened conductor electrodes on each layer. The location accuracy of these electrodes ensures that the proper ones are duly exposed during the machining process that generates the integral actuators. This process not only exposes the electrodes properly, but eliminates the sand blasting step normally used for electrode exposure in producing conventional circular actuators.

The side view shown in the detailed view of FIG. 2 shows the actuators attached to their common base and these exposed alternate electrodes. The other side of the same actuator looks the same, but what is exposed are the alternate set of electrodes.

Thus, each actuator 10,10 has a configuration of multilayers which are comprised of oppositely charged electrodes which are printed onto stacked layers of piezoelectric ceramic in a vertically interdigitated manner as illustrated. The consecutively ordered layers are oriented such that they are stacked on one another, in an alternating fashion, such that electrodes, of like polarity have an electrode layer of opposite polarity interposed therebetween such that all of the electrodes are in the proper spatial relationship. The internal electrodes are silk screened in a conventional manner onto the piezoelectric ceramic substrate and are aligned with each other using fiducial references.

As best seen in FIG. 2, the silk screened electrode pattern on alternate layers is exposed to one side of each actuator and a conductor 32 is run the full length thereof making electrical contact with each associated alternate layer and the leads of the card. The process of establishing the lead to conductor connections will be discussed in greater detail later. For the moment, it should be seen that all of the conductive layers on each side of the actuator together, the layers of a given actuator can all be energized simultaneously with the same voltage. The result is that each actuator stack is a minimum capacitance, parallel electrical, series mechanical device.

Each actuator 10,10 has its own lead 34,34 connected to an associated conductor so that all of the actuators are capable of being independently actuated. Also important, each conductor 32 connected to one side of the actuator is also electrically conductively connected to a second individually associated conductor or lead 34 which is printed onto one side face of the actuator card in a manner in accordance with the present invention. The manner by which such connection is made will be discussed in greater detail later. Notwithstanding, the actuator drive electronics for electrical actuation purposes connect to the distal ends 36 of the second individual conductors 34.

Each of the actuators 10,10 has a square cross section rendering an inherent benefit over a circular one in that it is less sensitive during the manufacturing process to dimensional variations in exposing the electrodes. That is, the exposed electrodes are disposed in a "plane" rather than in a "line".

As mentioned initially, when assembled, the actuator array cards 2,2 that make up the assembly of a deformable mirror are spaced side-by-side with one another as shown in FIG. 5. An analogy for the construction of such an assembly would be similar to stacking together three decks of playing cards, each separated by a small spacer equivalent to the thickness of a card. Thus, in the assembly illustrated in FIG. 4, each of the actuator array cards with their respective array groups attached are stacked together and are separated by a thin shim 40. A rigid backing plate 42 may also provided and the lower ends of each array card is attached thereto for rigidization of the array. The area containing all of the actuators (numbering typically 16,000), is lapped flat to receive the faceplate 1 of the assembly. Thus, FIG. 4 depicts a completed assembly of a deformable mirror with 150 actuator array cards containing approximately 16,000 actuators. A complete assembly consists of multiple layers of the cards 2,2. Each layer contains one row of actuators, the longest one being the length of the major diameter of the faceplate, typically, 150 actuators.

In accordance with a further aspect of the invention, it should be seen that each actuator array card consists of several pieces which are assembled together. In short, the it is the use of a preformed actuator array group 6 combined with a prewired ceramic substrate and tying them electrically together with a simple silk screening process which is an important aspect of the invention.

That is, each actuator array is defined by a long strip of actuators, all fabricated as a one-piece array. The circle in FIG. 2 encloses a magnified view of the actuators. The exposed sides revealing the alternate layers of conductors and insulators. This array would be manufactured accordingly to the process as discussed above. At the time of attachment to each card, each actuator would not have any leads. Each array is epoxy bonded to the top edge of the pre-fired ceramic substrate i.e. card. Prior to this, each card has the leads 36,36 (runs) of the circuit necessary to get the signals to the actuators from the controller.

The cards 2,2 are pre-fired ceramic substrates and are fabricated with all the runs 34,34 already formed therein and processed at a high temperature. Each card has end terminals 46,46 presoldered for connection to connection an I.C. etc., and is compatible with the control circuitry of the actuator array. The ceramic substrate material provides structural stiffness for the actuator to act against.

A fully assembled actuator array would not be able to survive the processing temperatures required for the ceramic substrate. Thus, the connection between the leads 34,34 on the ceramic cards and the conductors 32 on the actuators 10,10 is accomplished after bonding.

That is, after bonding of the actuator array to the pre-fired ceramic substrate, e.g. card 2, electrical connection are made by silk screening organic ink conductors over both the exposed edges of the actuator and the corresponding pre-printed run or lead 34 on the pre-fired ceramic substrate card 2. At the edges of each card, connectors 46 are attached.

In summary, the pre-fired ceramic substrate portion of the actuator array cards are processed at high temperatures using conventional techniques that would yield a completed piece containing all of the leads starting from the raised area and fanning out in a symmetrical pattern, half of which go to either side of the board. The portion of the leads (typically 0.010" wide, spaced with a 0.010" gap) on the board near the ends of the substrate would be all pretinned in the process such that surface mounted connectors (or I.C.S.s) could be added.

The pre-fired ceramic substrate card 2 is completely processed prior to attaching the actuator array since the actuators would not be able to survive the temperatures.

During the fabrication of the actuator array, the process produces exposed sides of each actuator that must be electrically attached to the outside world enabling actuation of each individual device. This connection would not be made until the actuator array is bonded to the prefired ceramic substrate or card. At that point, a simple organic silk screened process is used to connect all of the individual layers of the actuator with the appropriate "lead" on the prefired ceramic substrate. Thus, all of the connections are simultaneously made in one step without hand wiring each actuator as is now the state of the art.

Accordingly, the invention has been described by way of illustration and not limitation.

What is claimed is:

1. An assembly comprising:
   a plurality of thin plate-like members arranged in a side-by-side manner, each of said sides comprising a major face of said thin plate-like members;
   an array of a plurality of piezoelectric actuators formed along a portion of each of said members; and
   a plurality of leads disposed along each of said plate-like members and each connected to a respective one of said piezoelectric actuators.

2. An assembly as defined in claim 1 further characterized in that each said plate-like members is separated from the other by a spacer.

3. An assembly comprising:
   a plurality of thin plate-like members arranged in a side-by-side manner;
   an array of a plurality of piezoelectric actuators formed along a portion of each of said members, said piezoelectric actuators including opposite vertically extending sides defined by a plurality of stacked electrodes which extend to one of said vertically extending sides depending upon the designated polarity thereof; and
   a plurality of leads disposed along each of said plate-like members and each connected to a respective one of said piezoelectric actuators.

4. An assembly as defined in claim 3 further characterized in that said assembly includes said plurality of piezoelectric actuators each having a top flat surface which is disposed generally coplanar with the ends of other piezoelectric actuators.

5. An assembly as defined in claim 4 further characterized in that each of said plurality of actuators has a conductor screened onto one side thereof.

6. An assembly as defined in claim 5 further characterized in that each of said conductors on said actuators and said leads being connected by organic ink conductor thereon.

7. An assembly as defined in claim 6 further characterized in that each actuator has a configuration of multilayers which are comprised of oppositely charged electrodes which are printed onto stacked layers of ceramic in a vertically interdigitated manner.

8. An assembly as defined in claim 7 further characterized in that said electrodes on alternate layers being commonly connected on one of said sides of each actuator by said conductor running the full length thereof making electrical contact with said alternate electrode layers.

9. An assembly as defined in claim 5 further characterized in that each said plate-like members is a pre-fired ceramic substrate and each of said cards has preprinted electrical leads formed thereon over which is silk screened organic ink conductors continuously connected with exposed edges of the actuator.

10. An assembly as defined in claim 9 further characterized in that each said actuator array is connected to an associated card by an epoxy connection after prefiring of said plate-like members is accomplished.

* * * * *